Patented June 18, 1946

2,402,513

UNITED STATES PATENT OFFICE 2,402,513

ALPHA FURYL NITRILE SULPHONATES

Jack T. Thurston, Riverside, Conn., assignor to American Cyanamid Company, New York, N. Y., a corporation of Maine No Drawing. Application October 6, 1944, Serial No. 557,565

1 Claim. (Cl. 260—345)

This invention relates to certain new and useful compounds and to their preparation. More particularly, my invention relates to furyl substituted organic sulphonates.

An object of this invention is to provide sulphonates which contain a furyl group as a substituent.

Another object of this invention is to provide organic sulphonates suitable for the preparation of resins having cation active properties.

A further object of my invention is to provide processes for preparing the aforementioned sulphonates.

The compounds which form the subject of this invention have the following general formula:

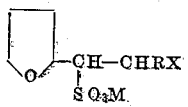

where X is an activating group possessing a polar bond, e. g.

aliphatic, —COOR, —CONRR, —CN, —NO$_2$; and where M is a metal or hydrogen or —H·NR$_2$R$_3$R$_4$ where R, R$_2$, R$_3$ and R$_4$ are hydrogen or organic radicals. The term "sulphonate" as used herein is intended to cover the hydrogen sulphonate as well as the metal, ammonia or amine salts thereof.

The sulphonates described above may be prepared by treating a compound of the following formula:

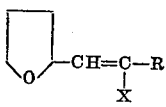

where X and R are the same as before, with a bisulphite or with sulphur dioxide in a suitable medium such as water or mixtures of organic solvents and water. Compounds of the formula

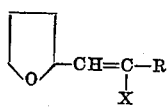

may be prepared by condensing 1 mol of furfural with 1 mol of a substance containing an active methyl group or an active methylene group, e. g. compounds having the formula:

(where R and X are defined in the same manner as above) or binylogs thereof.

The following examples in which the proportions are in parts by weight, except as otherwise indicated, are given by way of illustration and not in limitation and the furfural is 95% pure.

EXAMPLE 1

*Preparation of 2-cyano-3-potassium sulpho-3-alpha-furylpropanoic acid amide*

| | Parts |
|---|---|
| Furfurylidene cryanacetamide (1 mol) | 162 |
| Potassium metabisulphite (0.5 mol) | 111 |
| Water | 100 |

A mixture of these substances is heated until a clear solution is obtained. The solution is refluxed for about 2 hours and then evaporated, leaving a light yellow solid as a residue. About 155 parts of a slightly hydrated product is obtained.

EXAMPLE 2

*Preparation of 3-sodiumsulpho-3-alpha-furyl-propanoic acid nitrile*

| | Parts |
|---|---|
| 2-alpha-furylacrylonitrile (1 mol) | 119 |
| Sodium bisulphite (1 mol) | 104 |
| Water | 100 |

A mixture of these materials is heated with agitation on a steam bath until a clear solution is obtained. The solution is heated for three hours and evaporated to dryness, leaving a light yellow solid as a residue. The solid is washed with alcohol and dried, and a yield of about 203 parts of product is obtained.

In order to obtain the sulphonates contemplated by my invention it is apparent from the foregoing examples that 1 mol of furfural reacts with 1 mol of a substance containing an active methyl group or an active methylene group and the resulting compound in turn reacts with 1 mol of a bisulphite or sulphurous acid. It may be desirable, of course, in some instances to employ an excess of one of the reactants in order to drive the reaction to completion.

Other substances having an active methyl group or an active methylene group may be combined with furfural and converted to the sulphonate in accordance with the foregoing disclosure. Thus, for example, other nitriles may be used, e. g. acetonitrile, propionitrile, lauronitrile, crotonic nitrile, succinonitrile, phenylacetonitrile, sulphophenylacetonitrile, beta sulphopropionitrile, etc.

Compounds having the general formula:

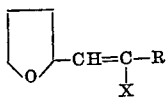

may be converted to the corresponding sulphonate by treatment with a bisulphite or with sulphur dioxide in a suitable medium such as water. Suitable bisulphites include sodium bisulphite, potassium bisulphite, ammonium bisulphite or any other desirable sulphite such as calcium bisulphite. In general the alkali metal bisulphites are preferred. The hydrogen sulphonates may be converted into the corresponding metal, ammonium or amine salts if desired. Examples of amines for such salts are: methyl amine, dimethyl amine, pyridine, triethyl amine, the mono-, di- and tri-ethanolamines, etc. Another method of producing the sulphonates is by treatment of the furfurylidene compounds with a hydrogen halide followed by treatment with sodium sulphite or with the alkali metal sulphites. Thus, for example, hydrogen chloride may be added to furyl acrylonitrile and the resulting material treated with sodium sulphite. Still another type of sulphonate may be prepared by the condensation of furfural with a halogen substituted nitrile such as chloracetonitrile, followed by treatment (1) with a hydrogen halide and then with a sulphite or (2) with an equimolecular mixture of a bisulphite and a sulphite. The bisulphite or sulphite may be a salt of an alkali metal, ammonia, or any other desired metal or amine.

The sulphonates may be prepared from the furfurylidene compounds by reaction with bisulphite at temperatures ranging upwards from room temperature. In most instances, the reaction is advantageously carried out at a temperature between about 70° C. and about 130° C. If sulphur dioxide be used, the reaction is preferably carried out under pressure, e. g., 25–100 pounds per sq. in., and/or at relatively low temperatures such as about 20° C. The time of reaction varies somewhat according to the compatibility of the reactants. Thus, if a homogeneous solution of the reactants be employed, the reaction will usually be completed in from about ½ hour to about 2 hours. On the other hand, if the solution of the reactants is not homogeneous, 6–8 hours or even more may be required. Generally, water is employed as the solvent medium for the bisulphite and the furfurylidene compound but if sufficient solubility is not obtained other solvents may be used. Mixtures of water and water-miscible organic solvents are especially suitable since the water is a good solvent for the bisulphite, while the organic solvent is a good solvent for the furfurylidene compound. Examples of suitable solvents are methanol, ethanol, propanol, isopropanol, tertiary butanol, dioxane, the lower alkyl mono-ethers of ethylene glycol and diethylene glycol, such as the mono-ethyl ether of ethylene glycol, the mono-butyl ether of diethylene glycol, etc. Furthermore, inert ketones may be employed as solvents for the reactants in the production of the sulphonates. In some instances it may be desirable to employ active ketones as intermediates in the preparation of the sulphonates. Thus, the bisulphite may add to an active ketone and this in turn reacts with the furfurylidene compound, the former giving up the bisulphite to the latter.

My furyl substituted sulphonic acids are especially suitable for resinification with an aldehyde to produce resinous materials having cation active properties. They are also useful in the preparation of emulsifiers, wetting agents, dispersing agents and as intermediates in the synthesis of many other organic compounds.

This application is a continuation-in-part of my copending application Serial No. 453,277, filed August 1, 1942.

Obviously many modifications and variations in the processes and compositions described above may be made without departing from the spirit and scope of the invention as defined in the appended claim.

I claim:

An ethane having an alpha-furyl group and a sulphonate radical in the 1-position and a cyano group in the 2-position.

JACK T. THURSTON.